United States Patent [19]
Charles et al.

[11] Patent Number: 5,251,927
[45] Date of Patent: Oct. 12, 1993

[54] STEER-SENSITIVE HYDRAULIC SHOCK ABSORBER AND METHOD

[75] Inventors: Harlan W. Charles, Harper Woods; Larry D. Miller, Rochester Hills, both of Mich.

[73] Assignee: General Motors Corporation, Detroit, Mich.

[21] Appl. No.: 855,394
[22] Filed: Mar. 20, 1992
[51] Int. Cl.$^5$ .............................................. B60G 17/06
[52] U.S. Cl. .................................... 280/672; 280/693; 188/299; 188/322.14; 188/314
[58] Field of Search ................... 188/299, 322.14, 314, 188/319; 280/693, 714, 668, 691, 672

[56] References Cited

U.S. PATENT DOCUMENTS

| 2,267,388 | 12/1941 | Wolf | 188/299 |
|---|---|---|---|
| 3,827,538 | 8/1974 | Morgan | 188/319 |
| 4,520,908 | 6/1985 | Carpenter | 188/319 |
| 4,685,545 | 8/1987 | Fannin et al. | 188/299 |
| 4,757,884 | 7/1988 | Fannin et al. | 188/319 |
| 4,789,051 | 12/1988 | Kruckemeyer et al. | 188/299 |
| 4,800,994 | 1/1989 | Imaizumi et al. | 188/319 |
| 4,800,995 | 1/1989 | Bernhardt et al. | 188/319 |
| 4,821,851 | 4/1989 | Kruckemeier et al. | 188/319 |
| 4,826,205 | 5/1989 | Kouda et al. | 280/703 |
| 4,948,163 | 8/1990 | Kikushima et al. | 280/707 |
| 5,080,205 | 1/1992 | Miller et al. | 188/319 |
| 5,120,031 | 6/1992 | Charles et al. | 280/693 |
| 5,150,775 | 9/1992 | Charles et al. | 188/299 |

FOREIGN PATENT DOCUMENTS

3737173-A1  5/1989  Fed. Rep. of Germany ...... 188/319

Primary Examiner—Karin L. Tyson
Attorney, Agent, or Firm—A. Michael Tucker

[57] ABSTRACT

A non-steerable shock absorber includes a steer-sensitive valve assembly placed in the lower working chamber of an inner cylinder in series with a compression valve. A linkage is provided between a turnable steering knuckle and the steer-sensitive valve assembly to vary the damping characteristics of the shock absorber based on a steering motion of a vehicle's wheels.

13 Claims, 2 Drawing Sheets

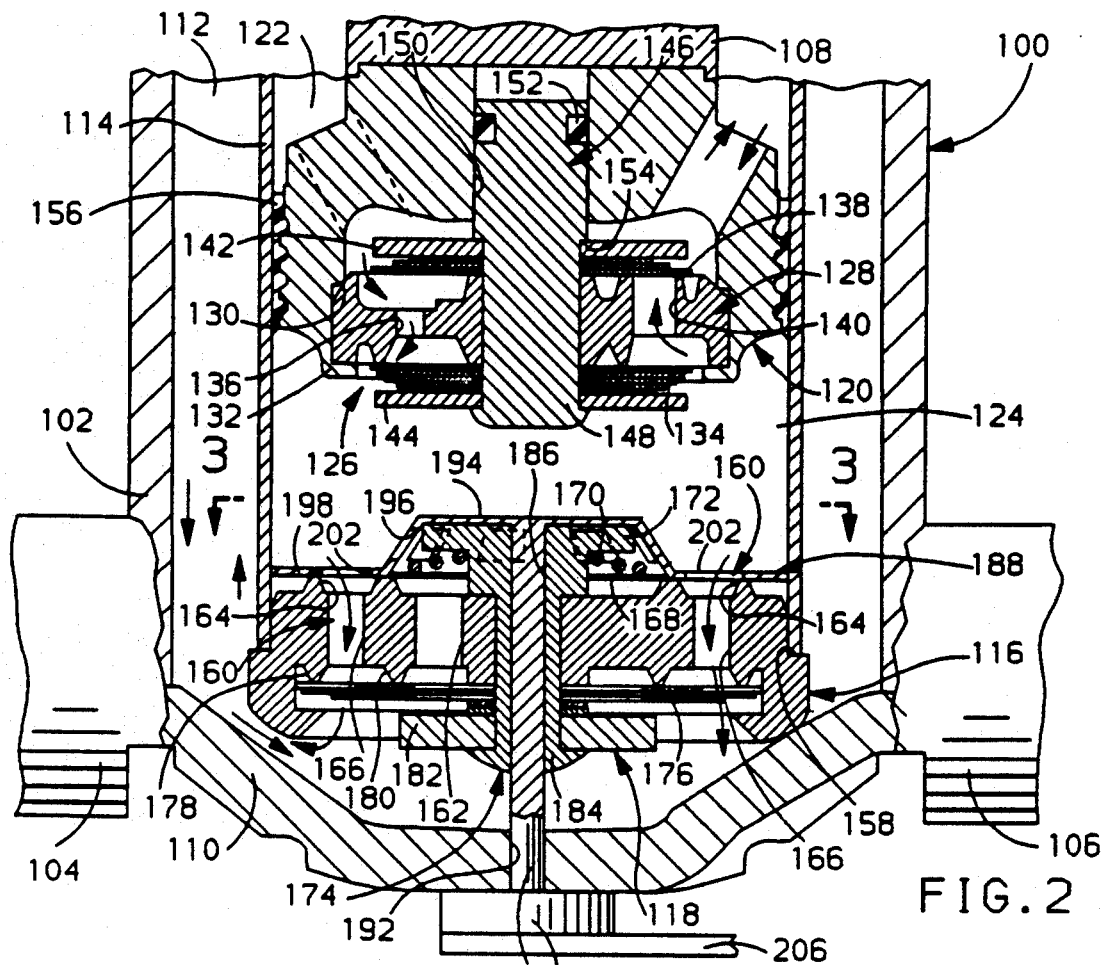
FIG. 2
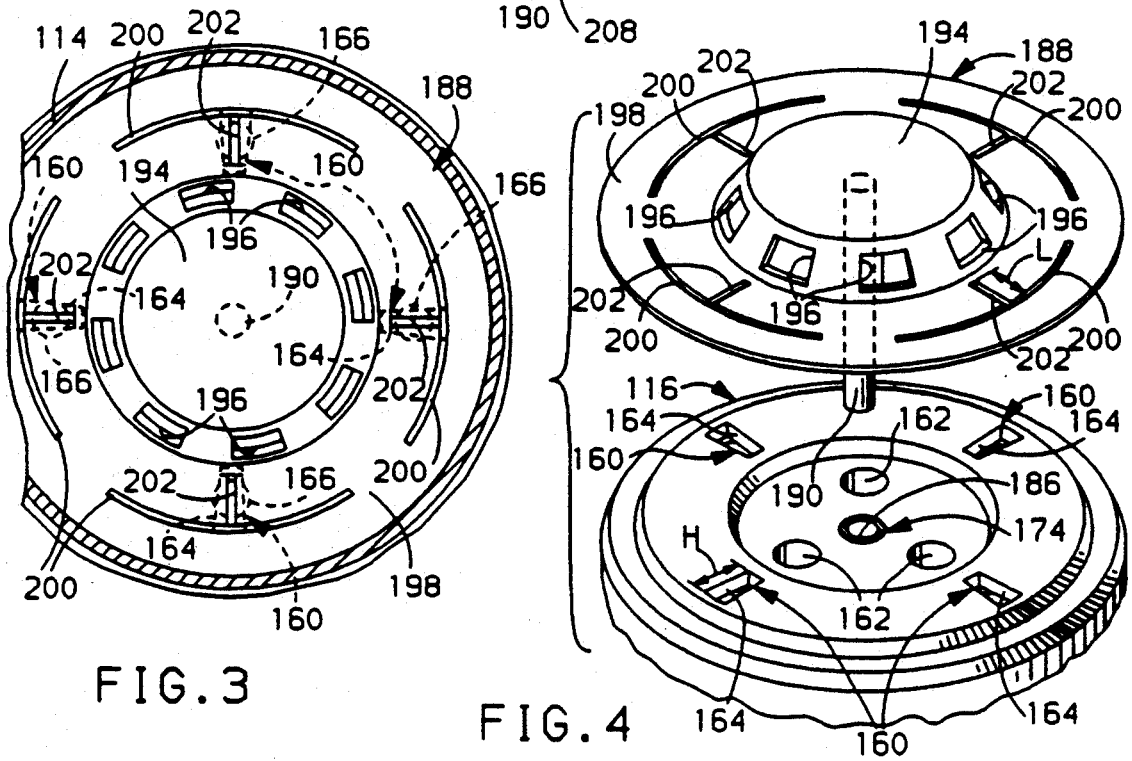
FIG. 3
FIG. 4

STEER-SENSITIVE HYDRAULIC SHOCK ABSORBER AND METHOD

CROSS-REFERENCE TO RELATED APPLICATIONS

The present invention is related to the inventions of applications Ser. No. 07/558,284, filed Jul. 26, 1990, now U.S. Pat. No. 5,080,205; Ser. No. 07/779,742, filed Oct. 21, 1991; Ser. No. 07/790,993, filed Nov. 12, 1991; and Ser. No. 07/810,058, filed Dec. 19, 1991.

BACKGROUND OF THE INVENTION

1. Field of the Invention

The present invention relates generally to hydraulic dampers for vehicular suspension systems. In particular, this invention is concerned with a non-steerable shock absorber having a reciprocating piston and piston rod mounted in a fluid-filled inner cylinder which provides variable damping dependent upon the rotation of a road wheel assembly.

2. Brief Description of the Related Art

Hydraulic dampers, including shock absorbers and struts, are well-known in vehicular suspension systems. The rate of damping of a hydraulic damper is often tuned by a piston valving assembly and/or a base valve assembly. Conventional piston and base valving assemblies employ various disk packs and spring-biased blow-off elements. During compression and rebound strokes of a damper, fluid flow through these valving assemblies determines the type of damping characteristic produced by the strut.

Many constructions have been developed to provide variable damping. In particular, it is well-known to provide a rotatable plate in a piston valving assembly to change the size of an orifice or other element to alter fluid flow through a piston valving assembly. Oftentimes, an electric motor is used to rotate a valve plate in a piston assembly.

The art continues to seek improvements. It is desirable for a variable non-steerable shock absorber to provide different damping rates for different driving conditions. In particular, during straight-ahead motion of a vehicle, a "soft" ride increases the comfort of passengers. During a steering motion when the vehicle wheels are turned, a "firm" damping rate provides greater control of the vehicle. It is desirable to provide a shock absorber which can vary the damping rate dependent upon these driving conditions.

SUMMARY OF THE INVENTION

The present invention includes a hydraulic damper for use with a vehicular suspension system. The present shock absorber provides variable damping dependent upon the turning motion of a road wheel assembly. A steer-sensitive valving assembly is an economical system which can be incorporated into conventional shock absorber components. During straight-ahead driving, a soft damping rate is provided. During a turning or cornering motion, firm damping enhances control of the vehicle.

In a preferred embodiment, a non-steerable shock absorber includes a steer-sensitive valve assembly placed in the lower working chamber of an inner cylinder in series with a compression valve. A linkage is provided between a turnable steering knuckle and the steer-sensitive valve assembly to vary the damping characteristics of the shock absorber based on a steering motion of a vehicle's wheels.

BRIEF DESCRIPTION OF THE DRAWINGS

FIG. 2 is an axial sectional view of a lower portion of the shock absorber of FIG. 1 removed from the suspension system for purposes of clarity of illustration.

FIG. 3 is a sectional view taken along line 3—3 of FIG. 2 illustrating a slotted control plate aligned with a cylinder end having a base valve assembly.

FIG. 4 is a perspective view of the slotted control plate exploded away from an upper surface of the cylinder end wherein the base valving assembly has been removed for purposes of clarity of illustration.

DETAILED DESCRIPTION OF THE DRAWINGS

Figure 1:
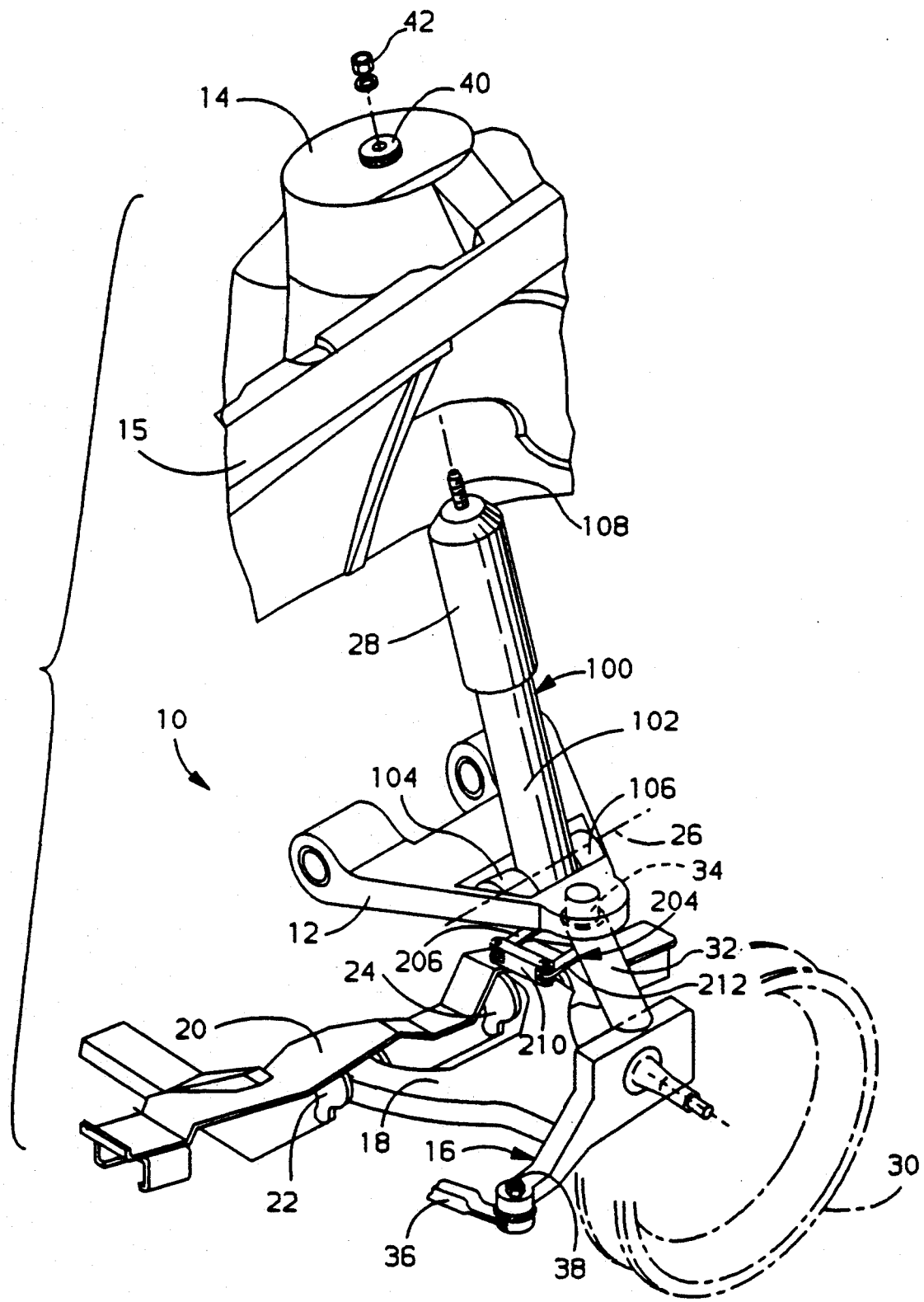
FIG. 1 is an exploded perspective view of an automotive suspension system incorporating the present steer-sensitive shock absorber operatively mounted between a vehicle body and an upper control arm.

FIG. 1 illustrates a vehicular suspension system indicated generally at 10. A hydraulic shock absorber indicated generally at 100 is operatively mounted between an upper control arm 12 and a mounting tower 14 formed in a vehicular body 15. A steering knuckle and spindle assembly 16 is mounted on the outer end of a lower control arm 18 by a conventional ball joint (not illustrated). The swiveling action of the ball joint allows the steering knuckle and spindle assembly 16 to be turned left or right and to move up and down with changes in the road surface. The lower control arm 18 is pivotally mounted at its inboard end to the vehicular frame 20 by pivot shafts 22, 24. In a similar manner, the upper control arm 12 is pivotally connected to the body 15 on a pivot shaft (not illustrated).

The shock absorber 100 includes an outer reservoir tube 102 having a pair of mounting fittings 104, 106 attached at its lower end on opposite sides. The mounting fittings 104, 106 pivotally connect the shock absorber 100 to the upper control arm 12 at pivot axis 26.

The steering knuckle and spindle assembly 16 mounts a road wheel 30 in a conventional manner. A support arm 32 includes a stem 34 pivotally received in complementary opening in the upper control arm 12. A steering linkage 36 is pivotally connected to the knuckle and spindle assembly 16 at pivot shaft 38. When a vehicle is steered, the steering linkage 36 moves laterally with respect to the longitudinal axis of the body 15 to turn the knuckle and spindle assembly 16 and the road wheel 30 in a well-known manner. During a turning motion, the shock absorber 100 does not rotate.

A suspension spring (not illustrated), e.g., a coil spring, is preferably mounted between the upper control arm 12 and the body 15 so that the body 15 is sprung upwardly from the frame 20. The shock absorber 100 damps spring forces which occur during use to enhance ride and control.

A piston rod 108 telescopically projects from an upper end of the reservoir tube 102 and is received by an isolator 40 and nut 42 to attach the piston rod 108 to the mounting tower 14. Preferably, a dust tube 28 is provided on the piston rod 108 and protects the portion of the piston rod 108 which extends from the reservoir tube 102 as the piston rod 108 reciprocates during use.

The lower portion of the shock absorber 100 is illustrated in FIG. 2 and removed from the suspension system 10 of FIG. 1 for purposes of clarity of illustration.

As described above, the shock absorber 100 includes the cylindrical reservoir tube 102 having mounting fittings 104, 106, secured to an outer surface. A base cup 110 is welded to and closes the lower end of the reservoir tube 102. The reservoir tube 102 surrounds and forms a fluid reservoir 112 with an inner cylinder 114. A cylinder end 116, fitted to and closing the inner cylinder 114, is seated on the base cup 110. A compression or base valve assembly 118 is mounted on the cylinder end 116 and controls the flow of fluid passing between the interior volume of the inner cylinder 114 and the reservoir 112 as described below.

A piston indicated generally at 120 is mounted to a lower end of the cylindrical piston rod 108 by any suitable means. The piston 120 divides the interior volume of the inner cylinder 114 into an upper chamber 122 and a lower chamber 124. The piston 120 carries a piston valving assembly 126 to control the flow of fluid between the upper and lower chambers 122, 124 as described below. The piston valving assembly 126 includes a cylindrical orifice plate 128 peripherally secured between an inner locator shoulder 130 and a radially inwardly coined annular skirt 132. A lower spring valve disk pack 134 comprised of a series of flat washer-like valve disks of spring steel having decreasing diameters top to bottom is mounted adjacent to a bottom surface of the orifice plate 128 to deflect downwardly in response to hydraulic fluid traveling through passage 136 during rebound stroke.

An upper spring valve disk pack 138 similar to disk pack 134 is comprised of a series of flat washer-like valve disks mounted adjacent a top surface of the orifice plate 128. The upper disk pack 138 deflects in response to hydraulic fluid traveling through passage 140 during a compression stroke. The disk packs 134,138 are held in operative position between upper and lower limit plates 142,144 by a centralized mounting connector 146 having a lower coined end 148 engaging the lower limit plate 144. The connector 146 projects downwardly from an axial channel 150 provided in the piston 120. The connector 146 is secured by any suitable means and carries an O-ring seal 152. An annular step 154 in the connector 146 engages the upper limit plate 142. An annular seal band 156, preferably formed polytetrafluoroethylene, is provided around the circumference of the piston 120 and forms a seal against an inner surface of the inner cylinder 114.

The cylinder end 116 includes a circumferential shoulder 158 press fit onto a lower end of the inner cylinder 114. A plurality of damping ports 160 and a plurality of return ports 162 (illustrated best in FIG. 4) are provided through the cylinder end 116. Preferably, each damping port 160 has an upper trapezoidal cross section 164 and a lower circular cross section 166. A valve disk 168 is mounted on an upper surface of the cylinder end 116 and held in place by a spring 170 seated against an upper flange end 172 of a centralized connector 174. A slotted valve disk pack 176 is provided on annular seats 178,180 on a lower surface of the cylinder end 116. A lower limit plate 182 is retained by a lower flanged end 184 of the connector 174.

An axial bore 186 having a preferably circular cross section is provided in the connector 174. A control plate 188 positioned between the piston 120 and the base valve assembly 118 includes a control shaft 190 which extends through the axial bore 186. Preferably, the cross section of the control shaft 190 is sized so that the control shaft 190 can rotate with respect to the connector 174 as described below. The control shaft 190 extends beyond the connector 174 and through an opening 192 in the base cup 110. If desired, a seal (not illustrated) can be provided at the base cup 110 to prevent the leaking of fluid from opening 192. The control plate 188 is fixed for rotation with the control shaft 190 and can be formed integrally with the control shaft 190 if desired.

The control plate 188 includes a radially inner, raised dome portion 194 having a plurality of circumferential ports 196. A radially outer plate portion 198 encircles the dome portion 194 and includes a plurality of spaced arcuate slots 200. Preferably, each slot 200 includes a radial leg 202 so as to form a somewhat T-shaped fluid opening. Hydraulic fluid passes through the ports 196 and the slots 200 as described below.

When assembled, each radial leg 202 is aligned with a respective damping port 160. It is desirable for the radial height H (FIG. 4) of each trapezoidal cross section 164 to substantially complement the length L of each respective radial leg 202 of the control plate 188.

The lower end of the control shaft 190 is joined to a linkage assembly 204 (FIG. 1) by any suitable means. A first arm 206 include a stem 208 secured to the control shaft 190 so that rotation of the arm 206 is transferred to the control shaft 190, and in turn to the control plate 188. The arm 206 is pivotally connected to a link 210 which is also pivotally connected to knuckle arm 212 extending from and rigidly secured to the support arm 32 of the knuckle and spindle assembly 16.

In operation, the upward and downward motion of the vehicular suspension system 10 due to road inputs results in compression and rebound of the shock absorber 100, and specifically, reciprocation of the piston 120 and the piston rod 108 in the inner cylinder 114. Fluid travels between the upper and lower chambers 122,124 through the piston valving assembly 126 in a well-known manner. During a compression stroke, fluid displaced by the piston rod 108 travels from the lower chamber 124 to the reservoir 112 through the control wheel 188 and the base valve assembly 118. During a rebound stroke, fluid returns from the reservoir 112 to the lower chamber 124 through the base valve assembly 118 and the control plate 188.

When the vehicle wheels and tires are aligned to provide straight movement of the vehicle, the legs 202 in the slots 200 of the control plate 188 are aligned with the trapezoidal cross sections 164 of the damping ports 160 as illustrated in FIGS. 2 and 3, thereby permitting a relatively greater flow from the lower chamber 124 to the reservoir 112. When the wheels and tires are turned with respect to the body 15 to steer the vehicle via the steering linkage 32, the turning motion is translated through the knuckle and spindle assembly 16 to the control shaft 190 and the control plate 188. At such time, the rotation of the control plate 188 with respect to the rotationally fixed cylinder end 116 is such that the legs 202 are no longer aligned with the trapezoidal cross sections 164, thereby reducing flow through the base valve assembly 118. Regardless of the position of the wheels 30, fluid returns from the reservoir 112 through the return ports 162 to deflect the valve disk 168 upwardly to reach the lower chamber 124.

As described above, the present shock absorber 100 provides a two-stage variable damper. The first stage occurs when the legs 202 are aligned with the damping ports 160, thereby permitting a relatively greater flow of fluid and providing for a "soft" damping rate. The second stage occurs when the stage legs 202 and the ports 160 are not aligned due to the rotation of the inner control plate 188 with respect to the cylinder end 116. In the second stage, a "firm" damping rate occurs as fluid passes at a relatively restricted rate from the lower chamber 124 to the reservoir 112 only through the arcuate slots 200 and the damping ports 160.

Depending upon the degree of rotation imparted by the knuckle and spindle assembly 16, a range of damping characteristics can be achieved with the shock absorber 100. For example, openings 200 can be sized to begin restricting fluid flow through the damping ports 160 with as little as 3-5 degrees of rotation of the control plate 188.

The present invention provides an economical variable shock absorber which is sensitive to the steering motion in a wheel assembly without the use of electric actuators and/or sensors. During straight-ahead driving, the damping of the present shock absorber 100 can be tuned to provide a soft and comfortable ride. However, during turning or cornering, when the wheel assembly is rotated, fluid flow through the base valve assembly 118, is restricted, thereby producing a stiffer ride which can improve handling of a vehicle.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A hydraulic damper for controlling the compression and rebound of a vehicular suspension spring, the damper comprising:
   (a) a reservoir tube;
   (b) an inner cylinder fixedly mounted within the reservoir tube and cooperating therewith to form a reservoir for a damping fluid contained within the reservoir tube and the inner cylinder;
   (c) base valve means operatively mounted at one end of the inner cylinder for controlling the flow of damping fluid between the inner cylinder and the reservoir tube;
   (d) a piston rod operatively mounted for reciprocating movement in the inner cylinder;
   (e) a piston secured to an inner end of the piston rod and dividing the interior of the inner cylinder into upper and lower chambers;
   (f) piston valving means in the piston establishing a restricted flow path through the piston the upper and lower chambers during compression and rebound of the damper; and
   (g) control valving means establishing a variable flow from the lower chamber through the base valve means to the reservoir, the control valving means connected to and actuated by a steering linkage of the vehicle.

2. The damper specified in claim 1 wherein the control valving means comprises:
   (a) a control shaft fixed for rotation with the steering linkage; and
   (b) a control wheel rotatably fixed to the control shaft having fluid slot means;
   whereby actuation of the steering linkage selectively aligns the slot means with the base valve means to vary fluid flow.

3. The damper specified in claim 2 wherein:
   (a) the base valve means includes a plurality of damping ports for guiding fluid from the lower chamber to the reservoir; and
   (b) the slot means includes a respective plurality of arcuate slots aligned with the damping ports.

4. The damper specified in claim 3 wherein each slot includes a radial leg.

5. The damper specified in claim 4 wherein the radial dimension of each leg is substantially equal to a radial dimension of a respective damping port.

6. The damper specified in claim 2 wherein the control shaft and the control plate are integrally formed.

7. A system for controlling the compression and rebound of a vehicular suspension spring with a variable hydraulic damper, the system comprising:
   (a) a reservoir tube;
   (b) a fluid-filled cylinder fixedly mounted within the reservoir tube and cooperating therewith to form a fluid reservoir;
   (c) base valve means mounted at one end of the cylinder for controlling fluid flow between the cylinder and the reservoir tube;
   (d) a piston reciprocably mounted in the cylinder and dividing the interior of the cylinder into upper and lower chambers;
   (e) a piston rod connected at one end to the piston rod and extending from the reservoir tube; and
   (f) control valving means establishing a variable flow from the lower chamber through the base valve means to the reservoir, the control valving means fixed for rotation with a vehicular steering linkage, wherein the area of aperture means provided in the control valving means is opened and closed by the relative rotation between the control valve means and the base valve means in response to a steering input to the vehicle.

8. The system specified in claim 7 wherein the control valving means comprises:
   (a) a control shaft fixed for rotation with the steering linkage; and
   (b) a slotted control plate fixed for rotation with the control shaft adjacent the base valve means.

9. A steer-sensitive valve assembly for controlling fluid in a vehicular hydraulic damper having a piston reciprocably mounted in a cylinder, the cylinder closed at one end by a base valve mean for controlling fluid flow from the cylinder to a reservoir formed between the cylinder and a reservoir tube, the valve assembly comprising:
   (a) a control plate mounted in the cylinder between the base valve means and the piston; and
   (b) means for rotating the control plate when a steering motion occurs in a vehicle including linkage means connected to the control plate and extending through the base valve means to a location external to the reservoir tube.

10. The valve assembly specified in claim 9 wherein the control plate includes a plurality of slots selectively alignable with the base valve means.

11. The valve assembly specified in claim 9 wherein the linkage means includes a control shaft secured to the control plate.

12. A method of varying the damping of a vehicular hydraulic shock absorber having a fluid-filled cylinder divided into first and second chambers by a reciprocable piston slidably mounted in the cylinder, the cylinder concentrically mounted in side a reservoir tube, the method comprising the steps of:

(a) fixing base valve means to the cylinder to control fluid flow between the cylinder and the reservoir tube;

(b) positioning a control plate in the cylinder between the piston and the base valve means;

(c) connecting the control plate to linkage means extending through the base valve means to a location external to the reservoir tube;

(d) connecting the linkage means to means for steering a vehicle; and (e) rotating the control plate as the means for steering is actuated.

13. The method specified in claim 12 including the steps of:

(a) connecting a control shaft to the control plate;

(b) extending the control shaft to a location external of the shock absorber; and (c) connecting the control shaft to the steering means.

* * * * *